(12) United States Patent
Nerone

(10) Patent No.: US 6,847,175 B2
(45) Date of Patent: Jan. 25, 2005

(54) LIGHTING BALLAST WITH REVERSE CURRENT FLOW PROTECTION

(75) Inventor: Louis R. Nerone, Brecksville, OH (US)

(73) Assignee: General Electric Company, Schenectady, NY (US)

( * ) Notice: Subject to any disclaimer, the term of this patent is extended or adjusted under 35 U.S.C. 154(b) by 84 days.

(21) Appl. No.: 10/247,793

(22) Filed: Sep. 19, 2002

(65) Prior Publication Data

US 2003/0090216 A1 May 15, 2003

Related U.S. Application Data

(60) Provisional application No. 60/323,447, filed on Sep. 19, 2001.

(51) Int. Cl.$^7$ .............................................. H05B 37/02
(52) U.S. Cl. .................. 315/224; 315/209 R; 315/291; 315/307
(58) Field of Search ................................ 315/224–225, 315/209 R, 244, 291, 307, DIG. 7

(56) References Cited

U.S. PATENT DOCUMENTS

| | | | | | |
|---|---|---|---|---|---|
| 4,170,747 A | * | 10/1979 | Holmes | ....................... | 315/307 |
| 4,348,615 A | * | 9/1982 | Garrison et al. | ............. | 315/219 |
| 4,464,606 A | * | 8/1984 | Kane | ............................ | 315/158 |
| 5,001,386 A | * | 3/1991 | Sullivan et al. | .............. | 315/219 |
| 5,059,870 A | | 10/1991 | Choon | ........................ | 315/289 |
| 5,796,214 A | | 8/1998 | Nerone | .................... | 315/209 R |
| 2003/0015970 A1 | * | 1/2003 | Nerone | ........................ | 315/291 |

OTHER PUBLICATIONS

Ben G. Streetman, Solid State Electronic Devices, 2$^{nd}$ Edition, Published 1980 by Prentice–Hall Inc., p. 217.*

* cited by examiner

Primary Examiner—Thuy Vinh Tran
(74) Attorney, Agent, or Firm—Fay, Sharpe, Fagan, Minnich & McKee, LLP

(57) ABSTRACT

In an electric lighting fixture, a lighting ballast circuit is provided. The circuit includes a lamp portion, a switching portion, and a drive portion. The lamp portion receives a light source 10. The drive portion is configured to supply signals to the switching portion. The switching portion includes first and second transistors 20, 22 that alternate periods of conductivity. First and second diodes 34, 36 in anti-parallel combinations with the first and second transistors 20, 22 help prevent reverse current flow through the transistors 20, 22. Third and fourth diodes 44, 46 in series combination with collectors of the transistors 20, 22 further help prevent reverse current flow through the transistors 20, 22. The first and second diodes 34, 36 route current from the drive portion via a path that by-passes the transistors 20, 22 so the transistors do not dissipate the power resultant from reverse current flowing thereacross. The third and fourth diodes 44, 46 block reverse current from flowing during periods of time when the first and second diodes 34, 36 are forward biased, but have not turned conductive.

19 Claims, 3 Drawing Sheets

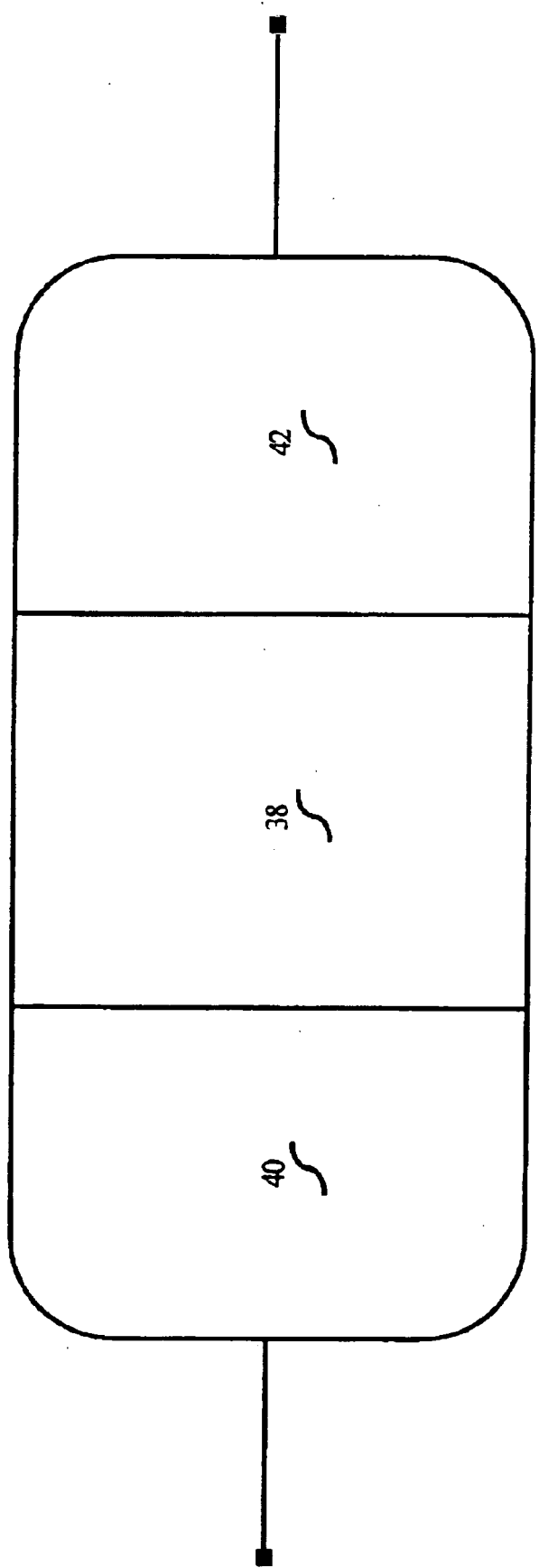

US 6,847,175 B2

LIGHTING BALLAST WITH REVERSE CURRENT FLOW PROTECTION

This application claims the benefit of U.S. provisional application Ser. No. 60/323,447 filed Sep. 19, 2001.

BACKGROUND OF THE INVENTION

The present invention relates to the artificial illumination arts. It finds particular application in protecting transistors in lamp ballasts from reverse current flow during switching operations and will be described with particular reference thereto. It is to be appreciated, however, that the present invention is also applicable to protecting vital components of other circuits from voltage and current surges, and is not limited to the aforementioned application.

Typical lamp ballasts driven off of a direct current (DC) bus signal include a pair of transistors that convert the DC signal to an alternating current (AC) signal for driving a lamp operably connected to the ballast. A fundamental current $I_o$, lags the driving voltage wave $V_o$. As a result, there are periods of time where current flows in a reverse direction over the transistors. Typically, the transistors are connected across high bus potentials, on the order of hundreds of volts, and even the smallest currents flowing backwards through the transistors cause high power dissipations. As a transistor dissipates power, it generates heat. The hotter a transistor becomes, the more inefficient it becomes, having a cumulative effect over time.

To help alleviate the reverse current flow problem, many ballast circuits incorporate diodes in anti-parallel relationships with the transistors, such as circuits similar to the one summarized in FIG. 1. The anti-parallel diodes provide low resistance paths to shunt reverse current away from the transistors. However, typical diodes do not exhibit instantaneous forward recovery characteristics, that is, the diodes do not immediately turn conductive the moment a forward bias is applied. In a time period where the forward recovery threshold of the diode has not been reached, reverse current still flows across the inactive transistor, turning both transistors active, temporarily.

BRIEF DESCRIPTION OF THE INVENTION

In accordance with one aspect of the present invention, a lighting ballast circuit is provided. The circuit includes a lamp portion, a switching portion, and a drive portion. The lamp portion receives a light source. The drive portion is configured to supply signals to the switching portion. The switching portion includes first and second transistors that alternate periods of conductivity. First and second diodes in anti-parallel combinations with the first and second transistors help prevent reverse current flow through the transistors. Third and fourth diodes in series combination with collectors of the transistors further help prevent reverse current flow through the transistors.

In accordance with another aspect of the present invention, a method of preventing reverse current flow across a transistor is provided. Current is routed in an anti-parallel direction through a first diode in an anti-parallel circuit combination with the transistor. Current flow is blocked by a second diode in a series combination with the transistor during a forward recovery period of the first diode.

In accordance with another aspect of the present invention, a lighting ballast is provided. A switching circuit of the ballast includes first and second transistors in series, susceptible to reverse current flow. A first diode in a series combination with a collector of the first transistor blocks reverse current flow across the first transistor. A second diode in a series combination with a collector of the second transistor blocks reverse current flow across the second transistor.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

FIG. 3 is a sectional view of a diode, in accordance with the present invention.

DETAILED DESCRIPTION OF THE INVENTION

Figure 1:
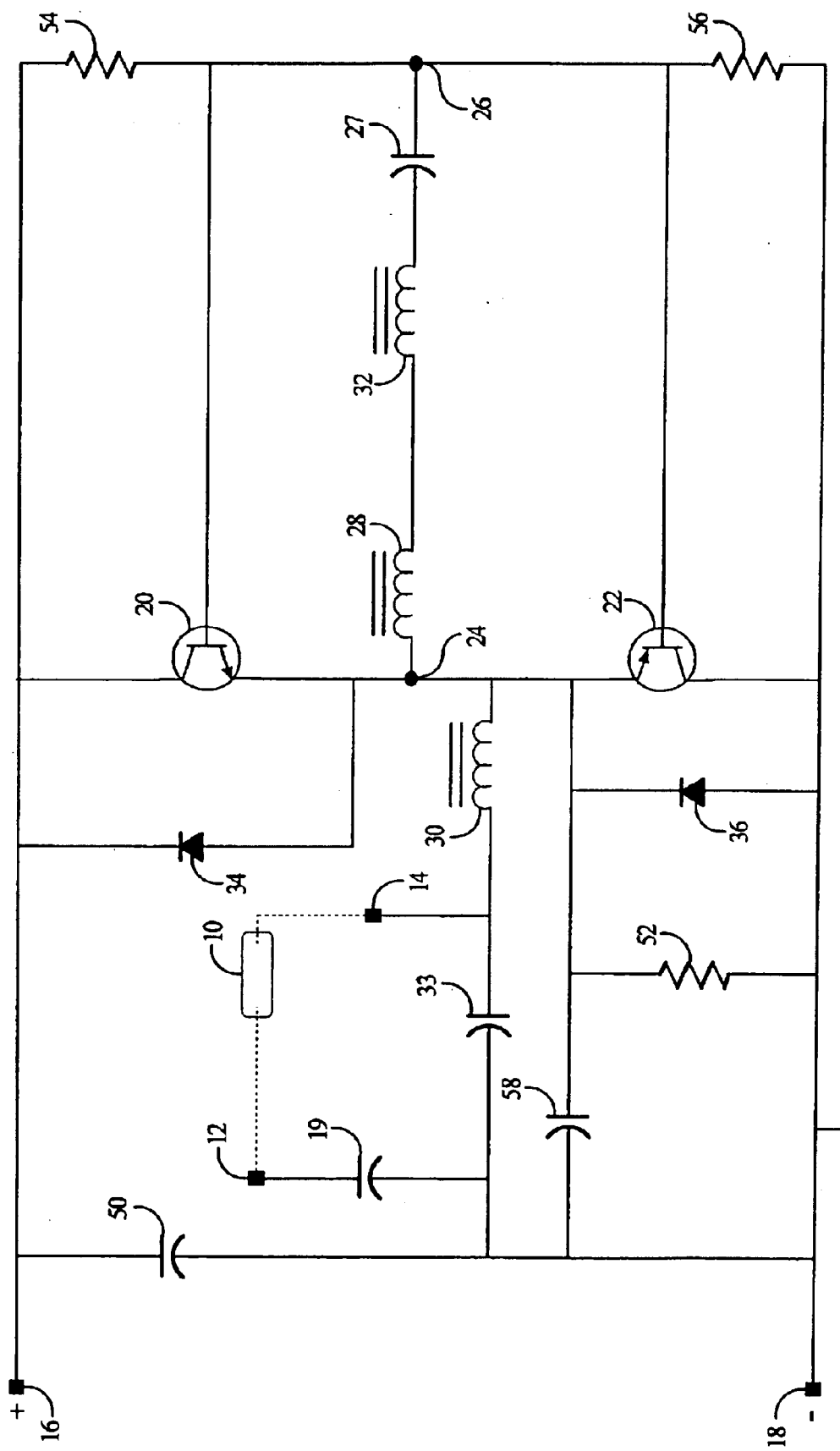
FIG. 1 is a circuit diagram of a prior art ballast circuit.
Figure 2:
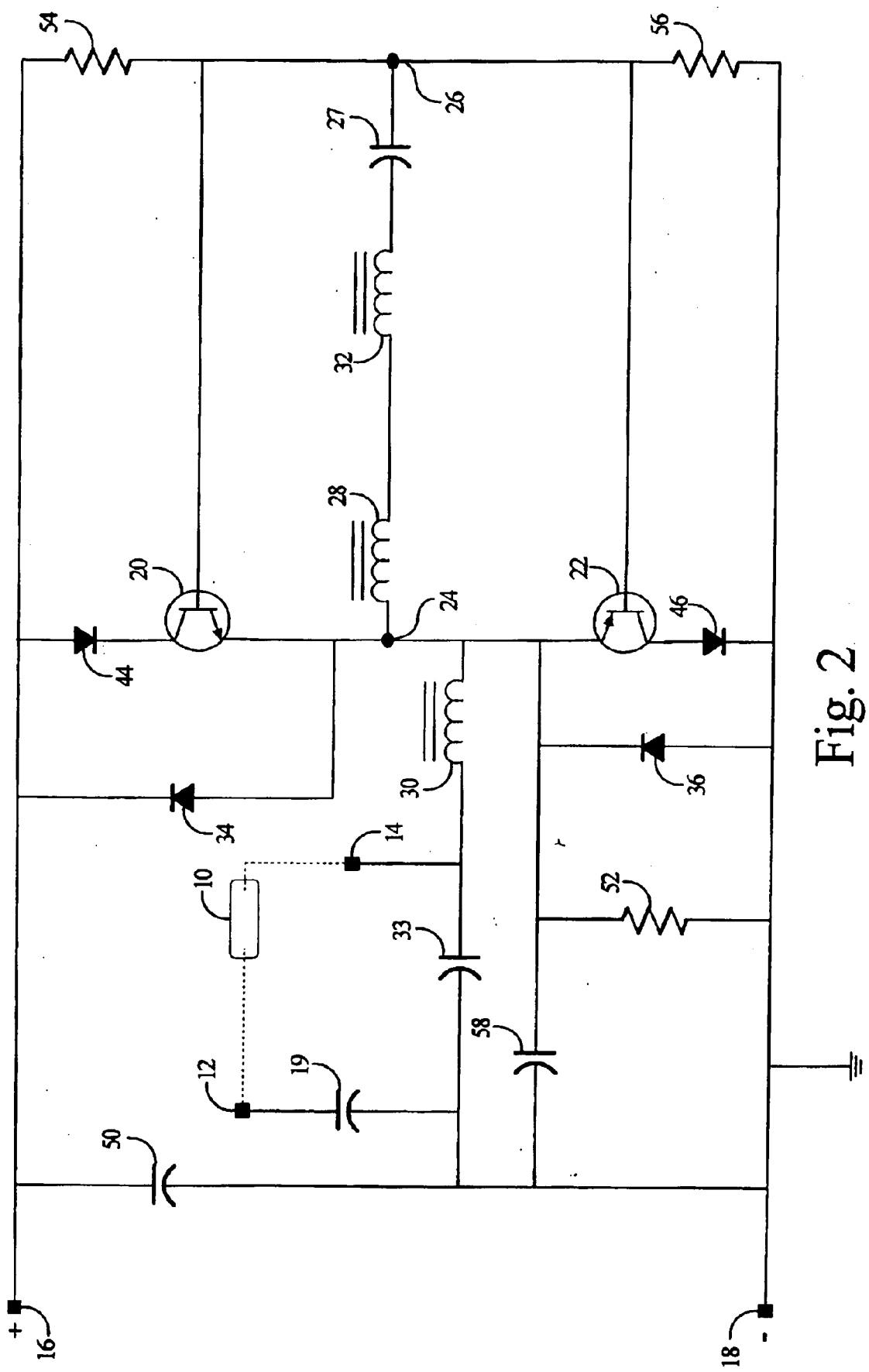
FIG. 2 is a circuit diagram of a ballast circuit, in accordance with the present invention.

With reference to FIG. 2, A light source 10 is operably connected between contacts 12, 14 of a ballast housing circuit. In the preferred embodiment, the circuit is connected at point 16 to a DC bus signal of 450 V. The circuit is referenced at point 18 to ground. The light source 10 is preferably a fluorescent lamp that operates at a particular frequency or range of frequencies. A DC blocking capacitor 19 is included between nodes 12 and 18. The ballast circuit provides AC power at the operational frequency of the lamp.

In order to convert a DC signal into an AC signal, a first transistor 20 and a second transistor 22 alternate between periods of conductivity and periods of non-conductivity, out of phase with each other. That is, when the first transistor 20 is conductive, the second transistor 22 is non-conductive, and vice-versa. The action of alternating periods of conduction of the transistors provides an AC signal across the contacts 12 and 14. In the preferred embodiment, the first transistor is a 13003 type transistor, and the second transistor is a 93003 type transistor.

Each transistor 20, 22 has a respective base and emitter. The voltage from base to emitter on either transistor defines the conduction state of that transistor. That is, the base-to-emitter voltage of transistor 20 defines the conductivity of transistor 20 and the base-to-emitter voltage of transistor 22 defines the conductivity of transistor 22 . As shown, the emitters of the two transistors 20, 22 are connected at a common node 24. The bases of the transistors 20, 22 are connected at a control node 26. The single voltage between the control node 26 and the common node 24 determines the conductivity of both transistors 20, 22. The collectors of the transistors 20, 22 are connected indirectly to the bus voltage 16 and ground 18, respectively.

A gate drive circuit, connected between the common node 24 and the control node 26 controls the conduction states of the transistors 20, 22. The gate drive circuit includes a serial capacitor 27, and a drive inductor 28 that is connected to a resonant inductor 30 at the common node 24. The other end of the drive inductor 28 is coupled to a phase inductor 32. The phase inductor 32 is used to adjust the phase angle of the base-emitter voltage appearing between nodes 24 and 26. The drive inductor 28 provides a driving energy for the operation of the drive circuit. The resonant inductor 30 along with a resonant capacitor 33 connected between nodes 14 and 18 determine the operating frequency of the lamp. The serial capacitor 27 charges to provide sufficient voltage to turn the first transistor 20 conductive. During steady state operation of the ballast, the serial capacitor 27 aids in switching between the two transistors 20, 22.

In the preferred embodiment, when one transistor is conductive, the other is completely non-conductive. That is, there are no periods of time when both transistors are conductive. To help prevent current from flowing in a reverse direction through the first transistor 20 while the second transistor 22 is conductive, a first diode 34 is included in the circuit in an anti-parallel relationship with respect to the first transistor 20. The first diode 30 provides a current shunt that redirects current from flowing in a reverse direction across the first transistor 20. Similarly, a second diode 36 is disposed in an anti-parallel relationship with the second transistor 22 that helps prevent current from flowing in a reverse direction across the second transistor 22 while the first transistor 20 is conductive. Preferably, the diodes 34, and 36 are PIN diodes, that is, as shown in FIG. 3, they have an intrinsic semi-conducting region 38 between a p-doped region 40 and an n-doped region 42. In one embodiment, the diodes used are 1N4004 type diodes. It is to be appreciated, of course, that other diodes having the required characteristics may also be used.

Diodes of this type typically have a forward recovery voltage, that is, a forward bias threshold that must be reached before the diode turns conductive. During periods of time when the forward recovery voltage is being reached, it is as if the diode is not in the circuit. During these time periods, current generated by the drive circuit can flow in a reverse direction across the transistor, turning it active when it should be inactive.

With reference again to FIG. 2, to prevent activation of the first transistor 20 during periods of time where the forward recovery voltage of the first diode 34 is being reached, a third, current blocking diode 44 is disposed in forward series combination with the collector of the first transistor 20. Thus, even if the first diode 34 has not turned conductive, the third diode 44 blocks current from flowing in a reverse direction across the first transistor 20, i.e., the third diode 44 stops current from flowing through the collector base junction of the first transistor 22. Similarly, a fourth, current blocking diode 46 is disposed in a forward series combination with the collector of the second transistor 22 to prevent reverse current flow across the second transistor 22 when the second diode 36 is reaching its forward recovery voltage. That is, the fourth diode 46 stops current from flowing through the collector base junction of the second transistor 22.

The third and fourth diodes 44, 46 can be low voltage diodes. Preferably, they have a tolerance above the peak forward recovery voltage of the first and second diodes 34, 36. Higher voltages, such as those that occur during normal operation of the ballast, turn the first diode 34 or the second diode 36 conductive, and the voltage tolerance of the third and fourth diodes 44, 46 becomes irrelevant. The third and fourth diodes 44, 46 need only possess the tolerance to withstand the voltage needed to turn the first and second diodes 34, 36 conductive. Consequently, one specific type of diode adequate for the intended purpose of the third and fourth diodes 44, 46 may be the 1N4004 type diode.

Additionally, the ballast circuit includes a smoothing capacitor 50 between the bus voltage 16 and ground 18 to smooth abnormalities and noise in the bus voltage signal. Starting resistors 52, 54, 56 prevent current in the ballast circuit from exceeding tolerable levels during startup, before the capacitors and inductors are charged. A so-called snubbing capacitor 58 is located between the node 24 and ground 18.

Exemplary component values for the circuit of FIG. 2 are as follows:

| Part Description | Part Number | Nominal Value |
| --- | --- | --- |
| Lamp | 10 | 23 watts |
| DC Bus Voltage | 16 | 450 Volts |
| Circuit Reference | 18 | 0 Volts |
| DC Blocking Capacitor | 19 | 47 nanofarads |
| First Transistor | 20 | 13003 |
| Second Transistor | 22 | 93003 |
| Drive Inductor | 28 | 360 microhenries |
| Resonant Inductor | 30 | 3.6 millihenries |
| Phase Inductor | 32 | 150 microhenries |
| Resonant Capacitor | 33 | 1.5 nanofarads |
| First Diode | 34 | 1N4004 |
| Second Diode | 36 | 1N4004 |
| Third Diode (FIG. 2) | 44 | 1N4004 |
| Fourth Diode (FIG. 2) | 46 | 1N4004 |
| Smoothing Capacitor | 50 | 220 nanofarads |
| Starting Resistor | 52 | 560 k Ohms |
| Starting Resistor | 54 | 560 k Ohms |
| Starting Resistor | 56 | 560 k Ohms |
| Snubbing Capacitor | 58 | 120 picofarads |

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

What is claimed is:

1. A lighting ballast circuit comprising:
   a lamp portion that includes contacts for receiving a light source;
   a switching portion including:
      a first transistor;
      a second transistor in series with the first transistor, the first and second transistors being conductive in alternating periods of time;
      a first diode in an anti-parallel combination with the first transistor that helps prevent reverse current flow through the first transistor;
      a second diode in an anti-parallel combination with the second transistor that helps prevent reverse current flow through the second transistor;
      a third diode connected to an input bus voltage in forward series combination with a collector of the first transistor that further helps prevent reverse current flow through the first transistor;
      a fourth diode connected to a circuit ground in forward series combination with a collector of the second transistor that further helps prevent reverse current flow through the second transistor; and,
   a drive portion configured to supply signals to the switching portion.

2. The lighting ballast as set forth in claim 1, wherein the third diode blocks reverse current across the first transistor during a forward recovery period of the first diode, and the fourth diode blocks reverse current across the second transistor during a forward recovery period of the second diode.

3. The lighting ballast circuit as set forth in claim 1, wherein the drive portion includes at least one inductor that produces current that flows in a reverse direction across the first transistor in an absence of the first and third diodes.

4. The lighting ballast circuit as set forth in claim 1, wherein the switching portion is connected across a 450 V bus potential.

5. The lighting ballast circuit as set forth in claim 1, wherein the first, second, third, and fourth diodes have an intrinsic semi-conducting region between p and n doped regions.

6. The lighting ballast circuit as set forth in claim 5, wherein the first, second, third, and fourth diodes are 1N4004 type diodes.

7. The lighting ballast circuit as set forth in claim 1, wherein the first transistor is a 13003 type transistor.

8. The lighting ballast circuit as set forth in claim 1, wherein the second transistor is a 93003 type transistor.

9. The lighting ballast circuit as set forth in claim 1, wherein the first diode is intrinsic within the first transistor, and the second diode is intrinsic within the second transistor.

10. A method of preventing reverse current flow across a transistor including:
   routing current in an anti-parallel direction through a first diode in an anti-parallel circuit combination with the transistor; and,
   blocking current flow in a reverse direction across the transistor with a second diode connected to a circuit ground in a series combination with a collector of the transistor during a forward recovery period of the first diode.

11. A lighting ballast circuit comprising:
   a lamp portion that includes contacts for receiving a light source;
   a switching portion including:
      a first transistor having a base, an emitter and a collector;
      a second transistor having a base, an emitter and a collector, the emitters of the transistors connected at a common node, the bases of the transistors connected at a control node, wherein a voltage between the control node and the common node determines conductivity of the transistors, the first and second transistors being conductive in alternating periods of time;
      a first diode in an anti-parallel combination with the first transistor that helps prevent reverse current flow through the first transistor;
      a second diode in an anti-parallel combination with the second transistor that helps prevent reverse current flow through the second transistor;
      a third diode connected to an input bus voltage in forward series combination with a collector of the first transistor that further helps prevent reverse current flow through the first transistor;
      a fourth diode connected to a circuit ground in forward series combination with a collector of the second transistor that further helps prevent reverse current flow through the second transistor; and,
      a gate drive circuit connected between the common node and the control node to control a conduction state of the transistors to supply signals to the switching portion.

12. The lighting ballast as set forth in claim 11, wherein the third diode blocks reverse current across the first transistor during a forward recovery period of the first diode, and the fourth diode blocks reverse current across the second transistor during a forward recovery period of the second diode.

13. The lighting ballast circuit as set forth in claim 11, wherein the drive portion includes at least one inductor that produces current that flows in a reverse direction across the first transistor in an absence of the first and third diodes.

14. The lighting ballast as in claim 11, wherein the switching portion is connected across a 450 V bus potential.

15. The lighting ballast circuit as set forth in claim 11, wherein the first, second, third, and fourth diodes have an intrinsic semi-conducting region between p and n doped regions.

16. The lighting ballast circuit as set forth in claim 15, wherein the first, second, third, and fourth diodes are 1N4004 type diodes.

17. The lighting ballast circuit as set in claim 11, wherein the first transistor is a 13003 type transistor.

18. The lighting ballast circuit as set forth in claim 11, wherein the second transistor is a 93003 type transistor.

19. The lighting ballast circuit as set forth in claim 11, wherein the first diode is intrinsic within the first transistor, and the second diode is intrinsic within the second transistor.

* * * * *